United States Patent
Johnson

(10) Patent No.: US 12,311,833 B1
(45) Date of Patent: May 27, 2025

(54) VEHICLE MARKER LIGHTING DEVICE HAVING A LIGHT PIPE

(71) Applicant: Ford Global Technologies, LLC, Dearborn, MI (US)

(72) Inventor: Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/650,418

(22) Filed: Apr. 30, 2024

(51) Int. Cl.
| | |
|---|---|
| *F21S 43/00* | (2018.01) |
| *B60Q 1/28* | (2006.01) |
| *F21S 41/25* | (2018.01) |
| *F21V 5/02* | (2006.01) |
| *F21Y 115/10* | (2016.01) |

(52) U.S. Cl.
CPC ............... *B60Q 1/28* (2013.01); *F21S 41/25* (2018.01); *F21V 5/02* (2013.01); *F21Y 2115/10* (2016.08)

(58) Field of Classification Search
CPC ... B60Q 1/28; F21S 41/25; F21V 5/02; F21Y 2115/10
See application file for complete search history.

(56) References Cited

U.S. PATENT DOCUMENTS

| | | | |
|---|---|---|---|
| 9,783,100 B2 | 10/2017 | Salter et al. | |
| 11,220,210 B1 | 1/2022 | Chen | |
| 11,441,754 B1* | 9/2022 | Johnson | ............... F21S 43/241 |
| 11,603,037 B1* | 3/2023 | Johnson | ............... B60Q 1/0035 |
| 11,906,128 B1 | 2/2024 | Chen et al. | |
| 12,018,811 B2* | 6/2024 | Maier | .................... F21S 43/237 |
| 2017/0282787 A1 | 10/2017 | Salter et al. | |

FOREIGN PATENT DOCUMENTS

CN          214057455 U        8/2021

* cited by examiner

*Primary Examiner* — Elmito Breval
(74) *Attorney, Agent, or Firm* — Vichit Chea; Price Heneveld LLP

(57) ABSTRACT

A vehicle marker lighting device includes a light source. The light source has an elongate light pipe with a first end operatively coupled to the light source and a second end having a metalized surface. The light pipe further has a plurality of prism optics extending into an outside surface of the elongate body. An inner lens is operatively coupled to the light pipe to receive light reflected from the plurality of prism optics and to output the light beam.

20 Claims, 9 Drawing Sheets

VEHICLE MARKER LIGHTING DEVICE HAVING A LIGHT PIPE

FIELD OF THE DISCLOSURE

The present disclosure generally relates to lighting devices, and more particularly relates to a vehicle lighting device having a light guide that serves as an illuminating light identification marker on the vehicle.

BACKGROUND OF THE DISCLOSURE

Motor vehicles are commonly equipped with various lighting devices. For example, vehicle exterior lamps may include lighting devices that serve as vehicle marker lights to identify one or more vehicle characteristics. It may be desirable to provide for a vehicle marker light that offers an efficient and uniform brightness for use on a vehicle.

SUMMARY OF THE DISCLOSURE

According to a first aspect of the present disclosure, a vehicle marker lighting device includes a light source. The light source has an elongate light pipe with a first end operatively coupled to the light source and a second end having a metalized surface. The light pipe further has a plurality of prism optics extending into an outside surface of the elongate body. An inner lens is operatively coupled to the light pipe to receive light reflected from the plurality of prism optics and to output the light beam.

Embodiments of the first aspect of the present disclosure can include any one or a combination of the following features:
  the lighting device is employed on the exterior of a vehicle as a vehicle identification lamp;
  the lighting device is employed within or proximate to a grill in a front end of the vehicle;
  the lighting device is located proximate or within the grill with at least two additional vehicle marker lighting devices;
  the elongate light pipe has a cylindrical body;
  the plurality of prism optics are found in a rear side of the light pipe;
  the plurality of prism optics each has an angle in the range of 5° to 45° (degrees);
  the plurality of prism optics each has an angle in the range of 10° to 30° (degrees);
  the plurality of prism optics is formed with a generally V-shaped groove having an angle as an inclined angle;
  the inner lens has a forward extending body with a front end for emitting light output; and
  the inner lamp is over molded to the light pipe.

According to a second aspect of the present disclosure, a vehicle marker lighting device includes a light source and an elongate light pipe. The elongate light pipe has a cylindrical body and a first end operatively coupled to the light source and a second end having a metalized surface. The light pipe further has a plurality of prism optics extending into an outside rear surface of the cylindrical body. An inner lens is operatively coupled to the light pipe to receive light reflected from the plurality of prism optics into output the light beam.

Embodiments of the second aspect of the present disclosure can include any one or a combination of the following features:
  the lighting device is employed on the exterior of a vehicle as a vehicle identification lamp;
  the lighting device is employed within or proximate to a grill in a front end of the vehicle;
  the lighting device is located proximate or within the grill with at least two additional vehicle lighting devices;
  the plurality of prism optics each has an angle in the range of 5° to 45° (degrees);
  the plurality of prism optics each has an angle in the range of 10° to 30° (degrees);
  the plurality of prism optics is formed with a generally V-shaped groove having an angle as an inclined angle;
  the inner lens has a forward extending body with a front end for emitting light output; and
  the inner lamp is over molded to the light pipe.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
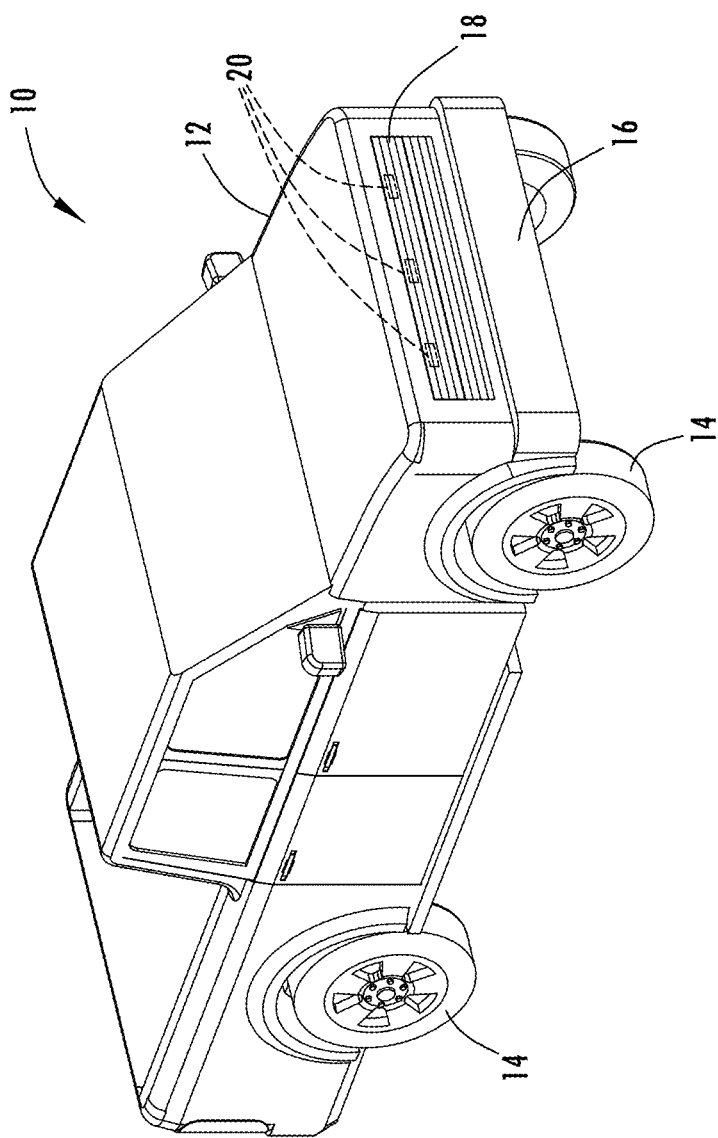
FIG. 1 is a front perspective view of a motor vehicle having a plurality of vehicle marker lighting devices arranged on the front end of the motor vehicle within a vehicle grill, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle marker lighting device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, one example of a motor vehicle 10 is generally illustrated equipped with a plurality of vehicle marker lighting devices 20 also referred to as vehicle identification (ID) lamps generally shown located on the body exterior at the front end 16 of the motor vehicle 10. The plurality of vehicle marker lighting devices 20 in the example shown are arranged in a horizontal line and spaced apart at the front end 16 of the motor vehicle 10 and are configured as vehicle identification (ID) lamps which may help identify one or more characteristics or features of the motor vehicle 10 by illuminating light in a pattern to provide patterned light illumination. For example, the vehicle marker lighting device 20 may indicate characteristics of the motor vehicle 10 such as vehicle size, vehicle shape, vehicle type and direction of travel. The vehicle marker lighting devices 20 are generally shown extending from a grill 18 at the front end 16 of the motor vehicle 10. It should be appreciated that the motor vehicle 10 may have a plurality of vehicle marker lighting devices 20 located in other locations on the motor vehicle 10 such as on a fender, on the bumper, on a component at the rear end of the motor vehicle 10, and other locations. Each of the vehicle marker lighting devices 20 is configured as a light illumination lamp advantageously providing light illumination with an efficient and substantially uniform light brightness.

The motor vehicle 10 shown and described herein in one example is a wheeled motor vehicle having a plurality of tire and wheel assemblies 14 configured to engage and rotate on a roadway. The motor vehicle 10 has a body 20 which generally defines a cabin interior also referred to as a passenger compartment. The body 20 generally defines the exterior shape of the motor vehicle 10. In the example shown, three separate vehicle marker vehicle lighting devices 20 are shown spaced apart horizontally on the exterior of the body 20 along a width of the grill 18 across the front end of the motor vehicle 10. It should be appreciated that one or more vehicle marker lighting devices 20 may be employed on the motor vehicle 10.

Figure 2:
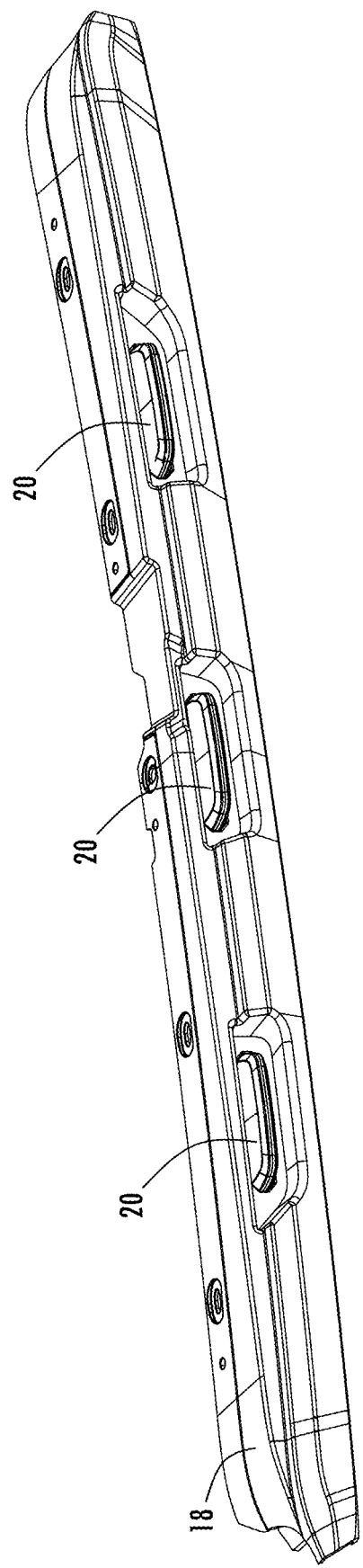
FIG. 2 is an enlarged perspective view of a portion of the grill at the front end of the motor vehicle with the vehicle marker lighting devices shown in FIG. 1.

Each of the vehicle marker lighting devices 20 is illustrated in FIG. 2 assembled at least partially within or on the grill 18 and arranged to illuminate light from the grill 18. The grill 18 generally has a housing including a rear housing part 18A on the rear side and front housing part 18B on the front side that connect together and define the overall housing. Disposed within the interior of the grill 18 and spaced apart are the three vehicle marker lighting devices 20. Each of the three vehicle marker lighting devices 20 are shown generally spaced apart evenly and at the same elevation across the width of the front end of the motor vehicle 10 within the grill 18. It should be appreciated that the grill 18 may have any number of shapes and sizes.

The vehicle marker lighting devices 20 advantageously provide for an identification marker for identifying the motor vehicle 10, such as the type of vehicle, size of the vehicle or shape of the vehicle, or one or more other characteristics or features of the motor vehicle 10, such as operating states of the motor vehicle 10, for example farewell and welcome lighting or direction of travel. The three vehicle marker lighting devices 20 are shown in one example extending through and partially forward of openings 28A and 28B which are found in both the rear and front housings 18A and 18B, respectively. As such, the three vehicle marker lighting devices 20 are seen when viewing the front side of the grill 18 and the front side of the motor vehicle 10. It should be appreciated that one or more vehicle marker lighting devices 20 may be located elsewhere on the motor vehicle 10 and in different arrangements.

Figure 3:
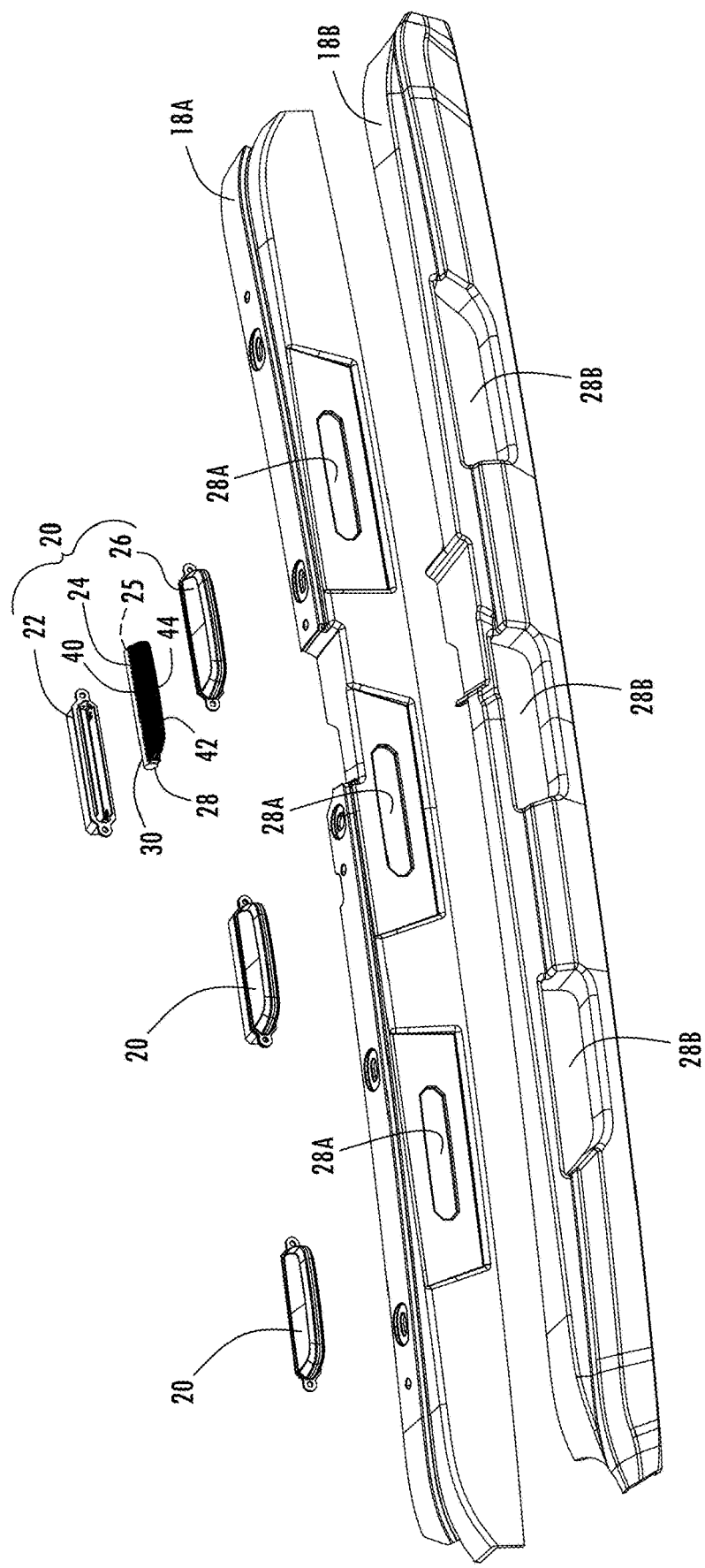
FIG. 3 is an exploded view of the vehicle grill and vehicle marker lighting devices shown in FIG. 2.

Each of the vehicle marker lighting devices 20 includes a rear housing 22 and an outer lens 26 as seen in FIG. 3. The vehicle marker lighting device 20 has an elongate light pipe 30 at the rear end generally disposed within the rear housing 20. The light pipe 30 is over-molded with an inner lens 42 that extends forward from a front end of the light pipe 30. The light pipe 30 has a generally cylindrical elongate body 30 with circular opposite first and second ends. A light source 25 is located at the first end 27 and oriented to illuminate light into the light pipe 30 and a light reflecting metalized surface is provided on the interior surface at the opposite second end 28. A prescription near field lens may be optically coupled between the light source 25 and the light pipe 24 to magnify the light prior to it reaching the optical prisms. The near field lens may be concave, converse or flat shaped and may have a plurality of optical pillows. Light illumination directed into the first end 27 of the light pipe 30 by the light source 24 is reflected forward within the inner lens 42 and is output via the front side 42 of inner lens 44. It should be appreciated that the metalized surface at the second end 28 advantageously reflects and recycles the light within the light pipe 30 and returns the light in an opposite direction until it is redirected out the front end 42 of the inner lens 44.

Figure 4:
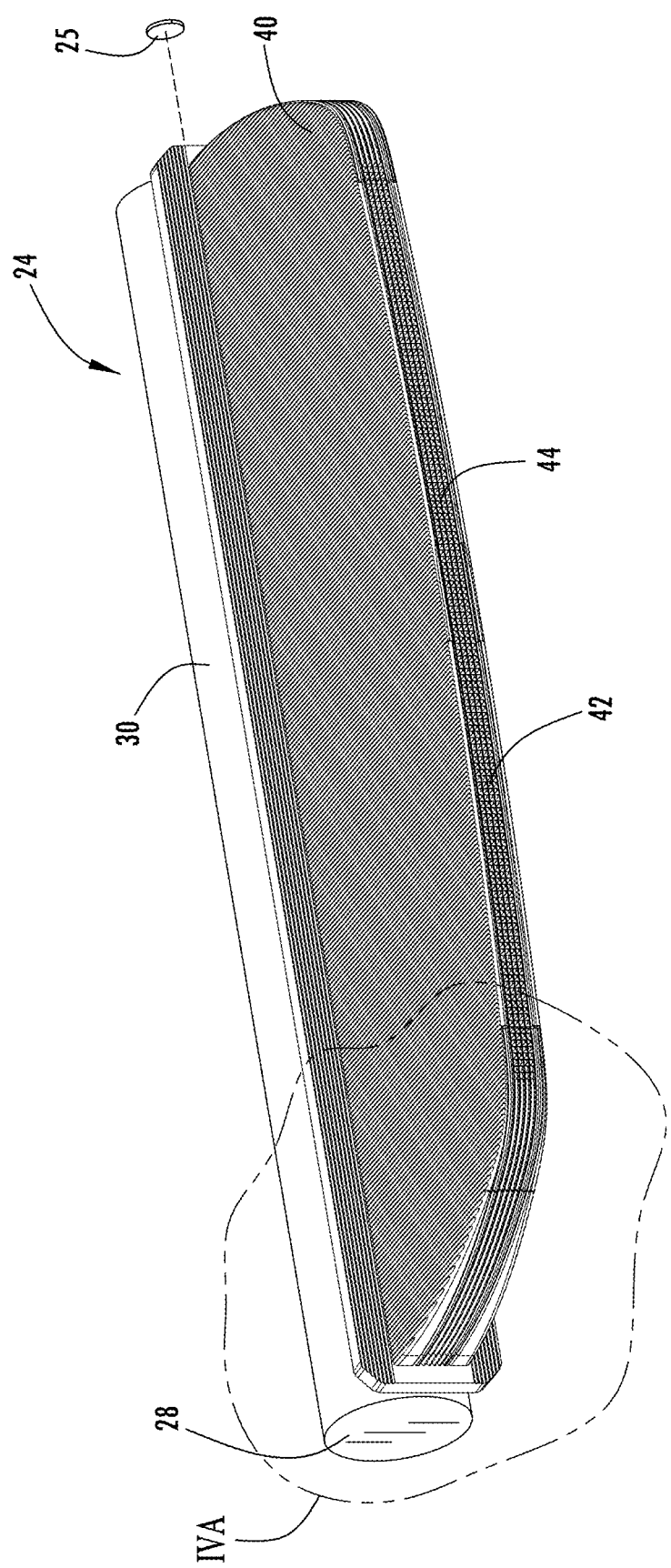
FIG. 4 is a front perspective view of a vehicle marker lighting device having a light pipe and over-molded inner lens.
Figure 4A:
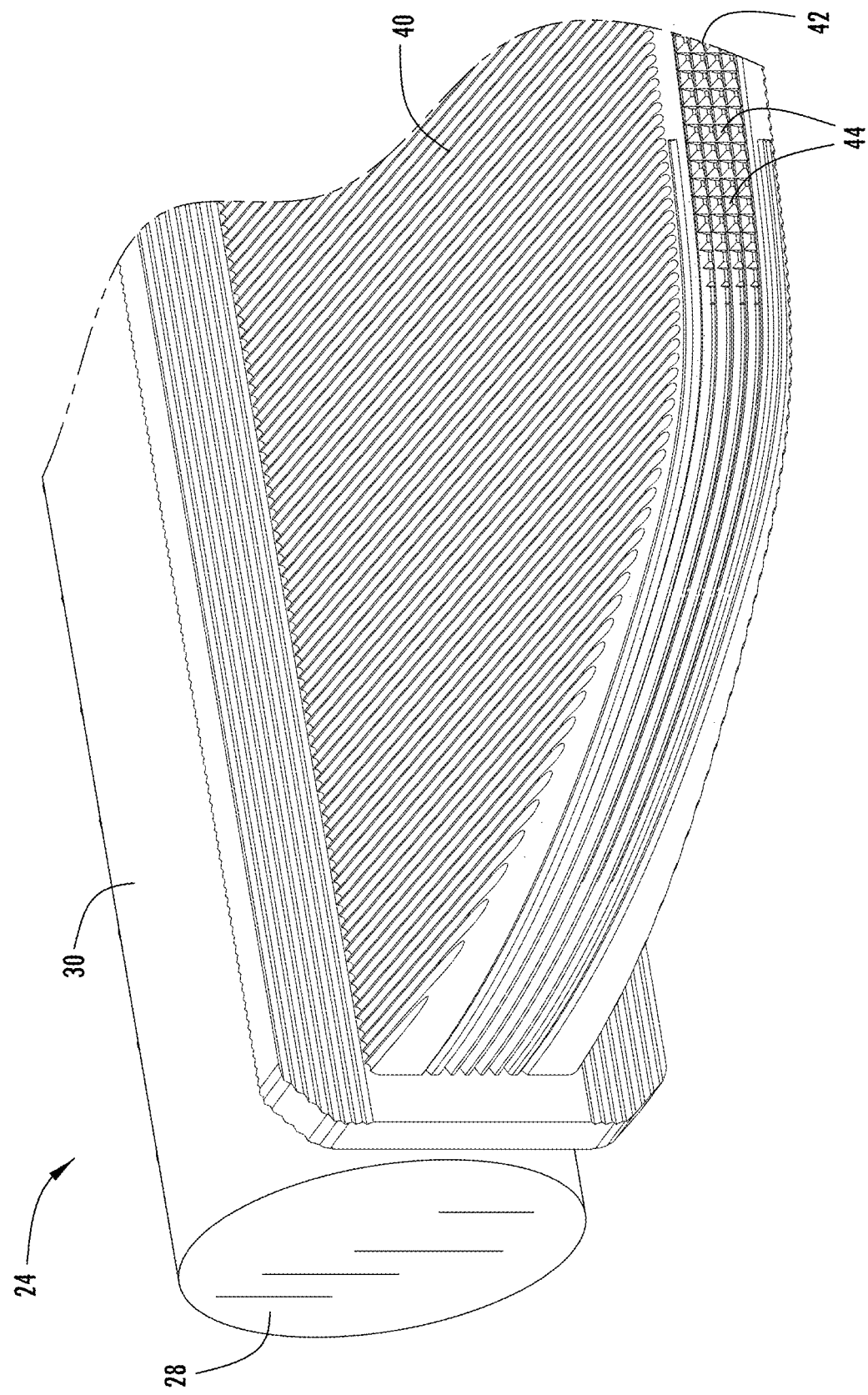
FIG. 4A is an enlarged view of section IVA shown in FIG. 4 further illustrating the vehicle marker lighting device.
Figure 4B:
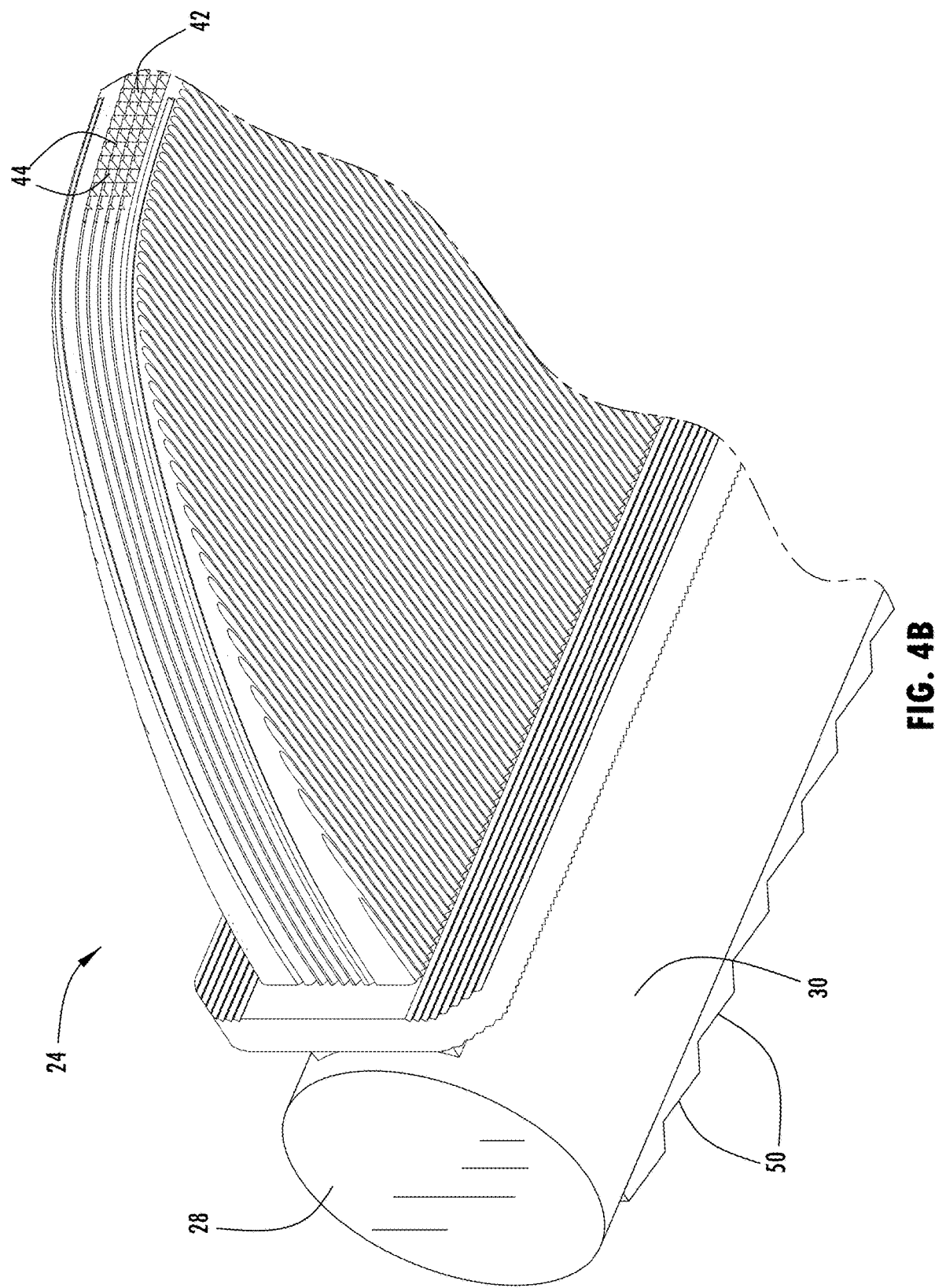
FIG. 4B is a lower perspective view of the vehicle marker lighting device shown in FIG. 4.

Referring to FIGS. 4, 4A and 4B, the front portions of the light pipe 24 and the over-molded inner lens 40 are illustrated in greater detail. As can be seen, the light source 25 may include a circuit board having one or more light emitting diodes (LEDs). The LEDs may include red, green, blue LEDs that may be controlled to provide a selectable light color and brightness. The LEDs are mounted onto an LED circuit board which in turn is assembled to the circular first end 27 of the cylindrical light pipe housing 30 at an end opposite of the metallized second end 28. The light source 25 may be mounted onto a printed circuit board that may include electrical circuitry for receiving electrical power, converting the electrical power to a suitable voltage such as a pulse-width modulated (PWM) voltage and supplying the converted electrical power at the suitable voltage to the corresponding light source 25 to power the light source 25 to generate light.

The inner lens 40 is advantageously over-molded onto a cylindrical sidewall of the body 30 of the light pipe 24. The inner lens 40 may include a polymeric optical material such as glass, plastic, polycarbonate or other optical light transmissive mediums. The inner lens 40 extends forward in a generally tapered shape with a flat top surface and a flat bottom surface forming a platform that extends forward to a front outlet 42 for emitting the light output. The front surface defines the output of the inner lens 40 and may include a plurality of optical prisms 44 that may be formed in both the horizontal and vertical directions to scatter light in a substantially uniform manner.

Figure 5:
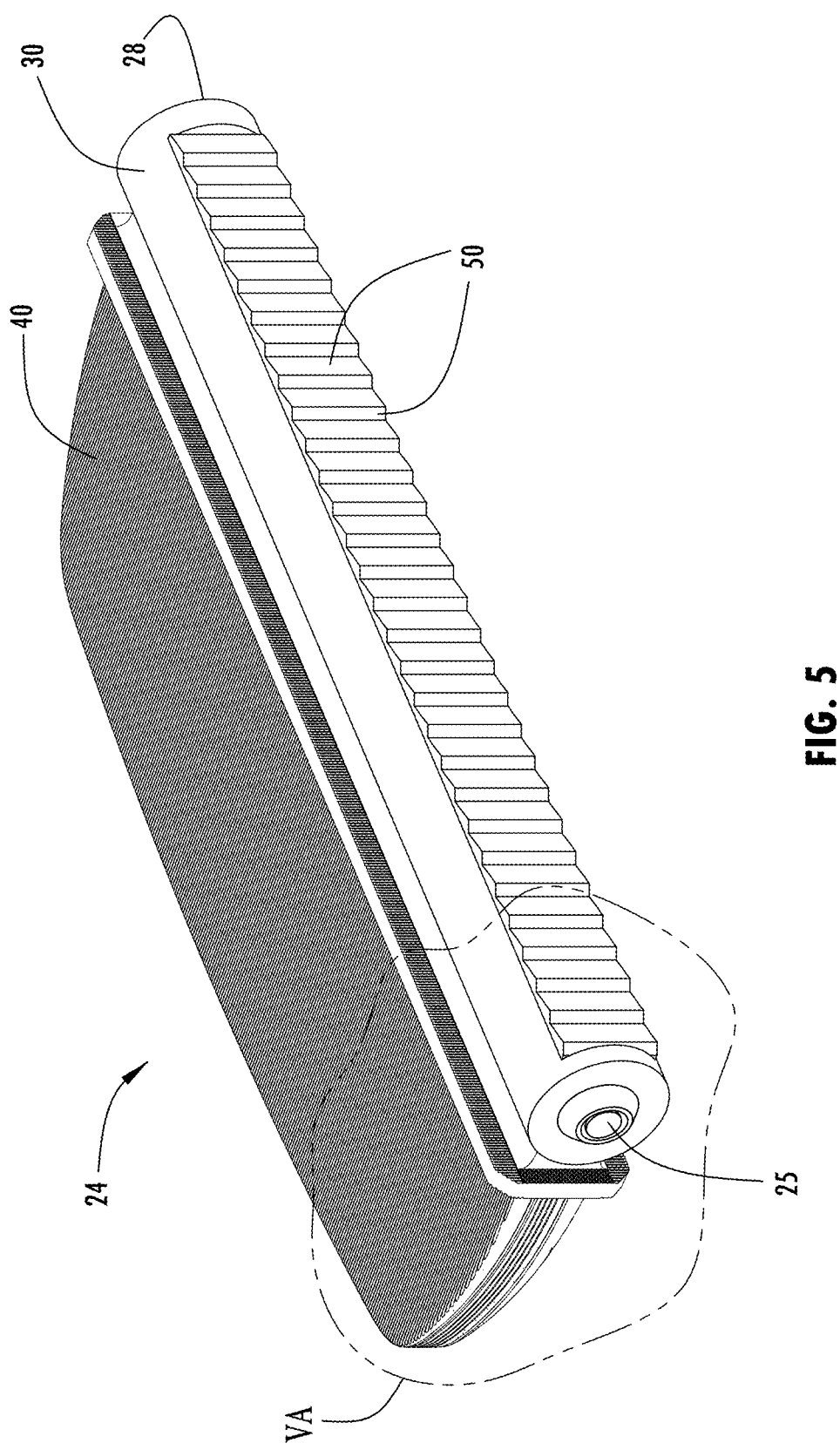
FIG. 5 is an upper rear perspective view of the vehicle marker lighting device shown in FIG. 4.
Figure 5A:
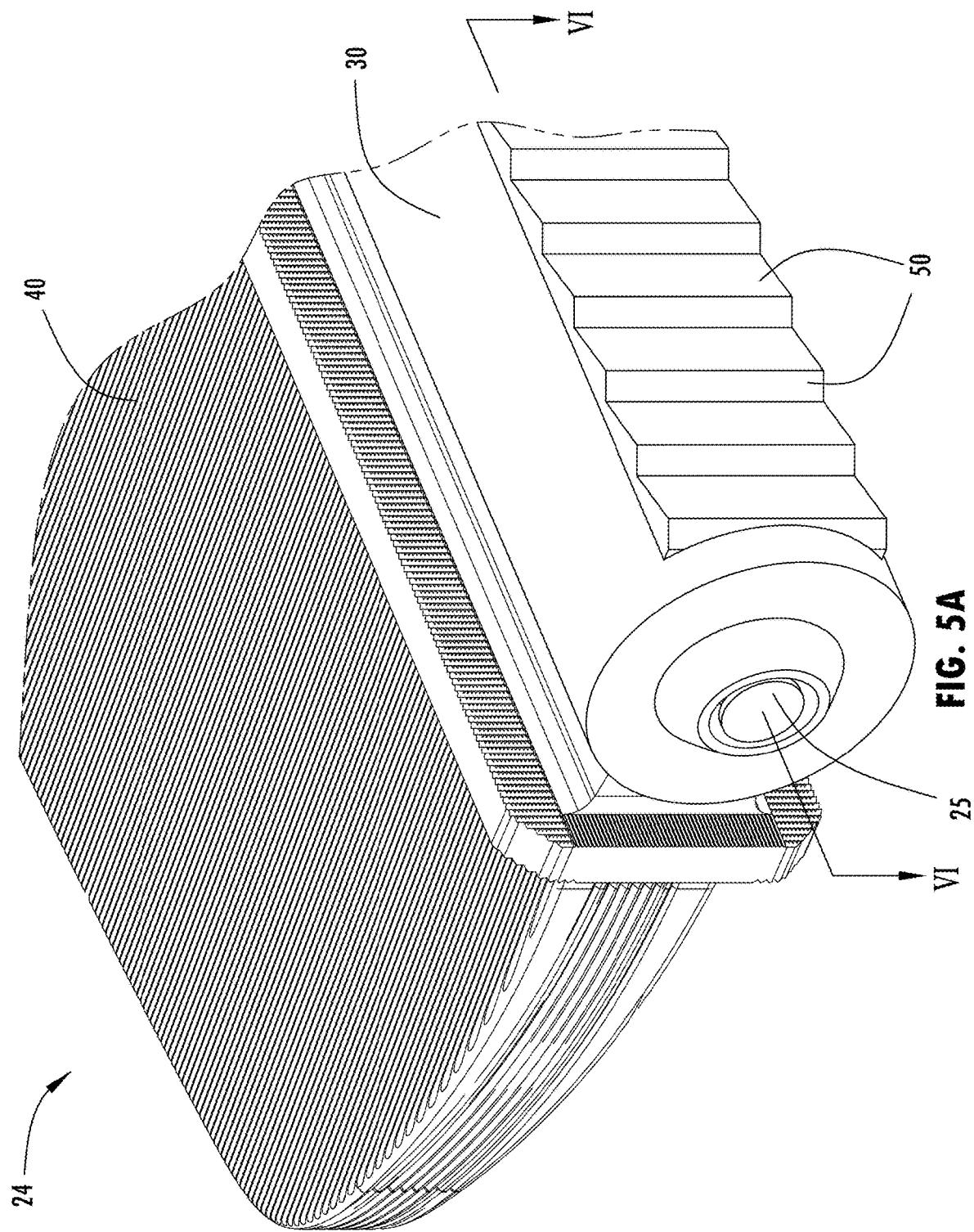
FIG. 5A is an enlarged view of section VA shown in FIG. 5 further illustrating the prism optics on the light pipe.
Figure 6:
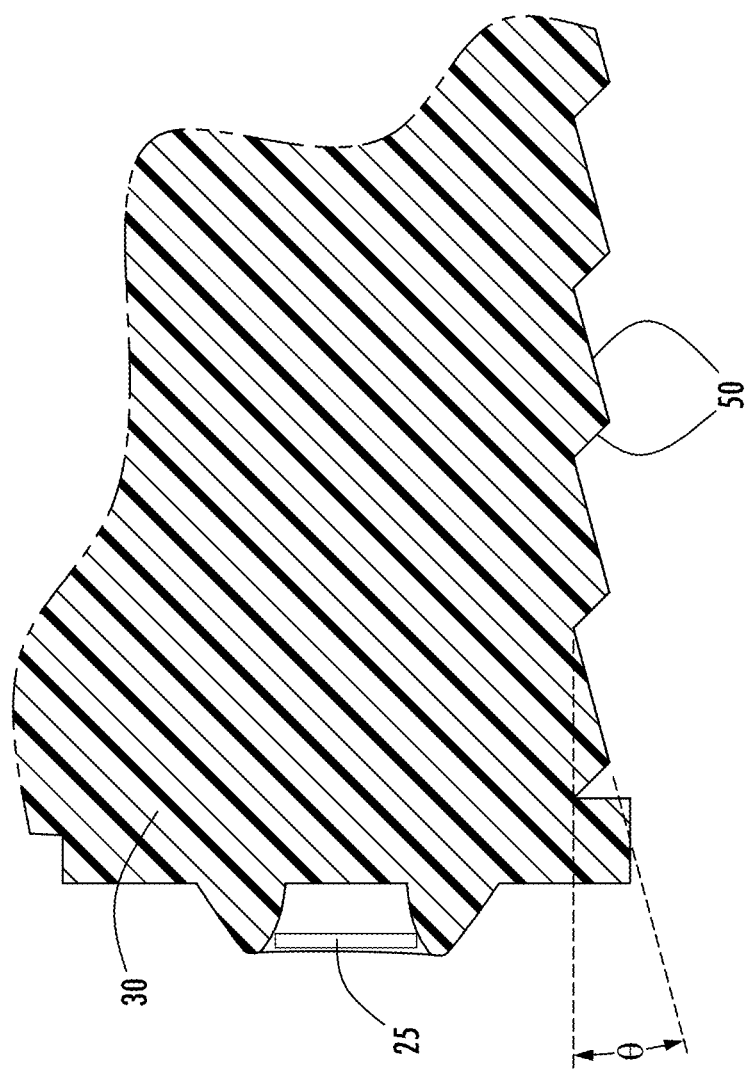
FIG. 6 is a cross-sectional view taken through line VI-VI of FIG. 5A further illustrating the prism optics.

Referring to FIGS. 5 and 5A, the light pipe 24 is further illustrated having a plurality of optical prisms 50 formed on a rear side of the cylindrical body 30 that serve as light collimators. The light pipe 24 may be made of a light transmissive medium having a high index of refraction in the range of about 1.4 to 1.7, according to one example. The light transmissive medium may include a transparent and rigid plastic such as polymethacrylate (PMMA), which is a synthetic resin produced from the polymerization and methacrylate and has an index of refraction of about 1.49, according to one example. According to another example, the light transmissive medium may include a thermoplastic polymeric, such as polycarbonate having an index of refraction of about 1.59. The light pipe 30 may be formed in a mold using injection molding and may be rigid or flexible depending on the thickness.

The light pipe 24 is formed with the light collimators that include a series of parallel aligned prism optics 50 which generally extend in a periodic arrangement along the axial axis on a portion of a rear outer surface of the light pipe 24. The light collimators collimate the light into an output beam directed through the inner lens. The light pipe 24 has a generally cylindrical body with a series of V-shaped grooves forming the prism optics 50 on the rear outer surface thereof. The V-shaped grooves result in a sawtooth configuration formed in the rear outer surface of the light pipe 24. The V-shaped grooves forming the prism optics 50 have an angle θ in the range of 5 degrees to 45 degrees, according to one embodiment, and in the range of 10 degrees to 30 degrees, according to another embodiment. According to a specific exemplary embodiment, the plurality of V-shaped prisms 50 each has an angle θ in the range of about 15 degrees. By providing an angle θ in the range of 5 degrees to 45 degrees, or more specifically of about 15 degrees, light generated by the light source that is transmitted towards the prism optics 50 is reflected and emitted from the front output side of the inner lens 40 in a substantially uniform lighting brightness through a wide range.

The vehicle marker lighting device 30 advantageously provides for an efficient and substantially uniform brightness light output that may serve as an identifier marker on a motor vehicle 10. The plurality of the vehicle marker lighting device 30 arranged in a specific pattern may be utilized together to provide transition lighting effects such as color changes, lighting patterns, lighting sequences and other effects.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle marker lighting device comprising:
   a light source;
   an elongate light pipe having a first end operatively coupled to the light source and a second end having a metalized surface, the light pipe further having a plurality of prism optics extending into an outside surface of the elongate body; and
   an inner lens operatively coupled to the light pipe to receive light reflected from the plurality of prism optics and to output the light beam.

2. The vehicle marker lighting device of claim 1, wherein the lighting device is employed on the exterior of a vehicle as a vehicle identification lamp.

3. The vehicle marker lighting device of claim 2, wherein the lighting device is employed within or proximate to a grill in a front end of the vehicle.

4. The vehicle marker lighting device of claim 3, wherein the lighting device is located proximate or within the grill with at least two additional vehicle marker lighting devices.

5. The vehicle marker lighting device of claim 1, wherein the elongate light pipe has a cylindrical body.

6. The vehicle marker lighting device of claim 5, wherein the plurality of prism optics is formed with a generally V-shaped groove having an angle as an inclined angle.

7. The vehicle marker lighting device of claim 5, wherein the plurality of prism optics are found in a rear side of the light pipe.

8. The vehicle marker lighting device of claim 7, wherein the plurality of prism optics each has an angle in the range of 5° to 45° (degrees).

9. The vehicle marker lighting device of claim 7, wherein the plurality of prism optics each has an angle in the range of 10° to 30° (degrees).

10. The vehicle marker lighting device of claim 1, wherein the inner lens has a forward extending body with a front end for emitting light output.

11. The vehicle marker lighting device of claim 1, wherein the inner lamp is over molded to the light pipe.

12. A vehicle marker lighting device comprising:
a light source;
an elongate light pipe having a cylindrical body and a first end operatively coupled to the light source and a second end having a metalized surface, the light pipe further having a plurality of prism optics extending into an outside rear surface of the cylindrical body; and
an inner lens operatively coupled to the light pipe to receive light reflected from the plurality of prism optics into output the light beam.

13. The vehicle marker lighting device of claim 12, wherein the lighting device is employed on the exterior of a vehicle as a vehicle identification lamp.

14. The vehicle marker lighting device of claim 13, wherein the lighting device is employed within or proximate to a grill in a front end of the vehicle.

15. The vehicle marker lighting device of claim 14, wherein the lighting device is located proximate or within the grill with at least two additional vehicle lighting devices.

16. The vehicle marker lighting device of claim 12, wherein the plurality of prism optics each has an angle in the range of 5° to 45° (degrees).

17. The vehicle marker lighting device of claim 12, wherein the plurality of prism optics each has an angle in the range of 10° to 30° (degrees).

18. The vehicle marker lighting device of claim 12, wherein the plurality of prism optics is formed with a generally V-shaped groove having an angle as an inclined angle.

19. The vehicle marker lighting device of claim 12, wherein the inner lens has a forward extending body with a front end for emitting light output.

20. The vehicle marker lighting device of claim 12, wherein the inner lamp is over molded to the light pipe.

* * * * *